United States Patent [19]

Stinnes

[11] 3,991,718

[45] Nov. 16, 1976

[54] SILOS

[76] Inventor: Wolf Walter Stinnes, 31 Johan Rissik Ave., Pretoria, South Africa, 0002

[22] Filed: May 6, 1975

[21] Appl. No.: 575,083

[30] Foreign Application Priority Data

May 8, 1974 South Africa.................... 74/2927

[52] U.S. Cl............................................ 119/51 R
[51] Int. Cl.² .................................... A01K 5/00
[58] Field of Search.............. 119/51 R, 16, 58, 60

[56] References Cited
UNITED STATES PATENTS

| | | | |
|---|---|---|---|
| 3,063,416 | 11/1962 | Elstner............................. | 119/51 R |
| 3,214,221 | 10/1965 | Finnegan.................... | 119/51 R UX |
| 3,427,790 | 2/1969 | Flittie............................ | 119/51 R X |
| 3,620,192 | 11/1971 | Taylor et al. ........................ | 119/16 |

Primary Examiner—Hugh R. Chamblee
Attorney, Agent, or Firm—Holman & Stern

[57] ABSTRACT

A horizontally-disposed silo for producing fodder comprising a trough structure having a generally U-shaped transverse cross-section and an inclined bottom; liquid and gas discharge means connected to the trough structure; the trough including a substantially semi-rigid flexible cover progressively removable from the trough and including sealing tongue elements of a resiliently flexible material received in a cooperating abutment surface in a substantially gas-tight manner to substantially seal off the silage-forming material in the silo and maintain it in a gas-tight relationship so that decomposition of the silage-forming material is substantially eliminated.

10 Claims, 7 Drawing Figures

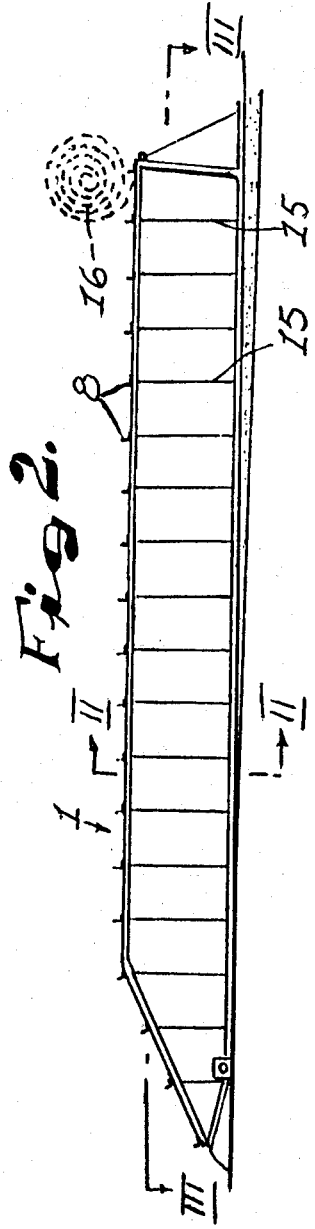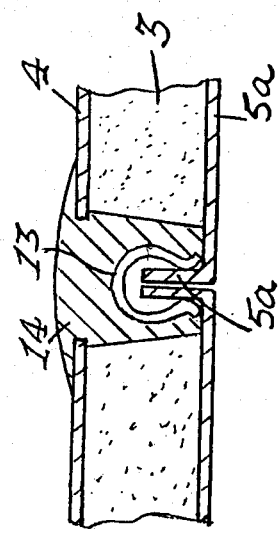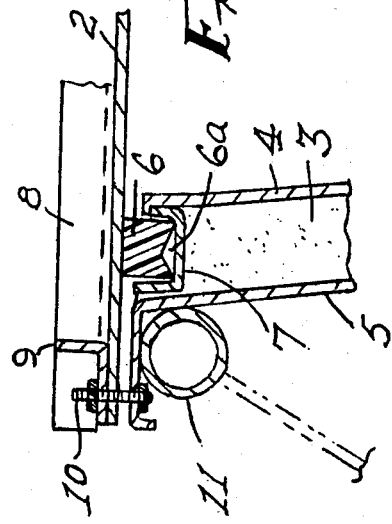

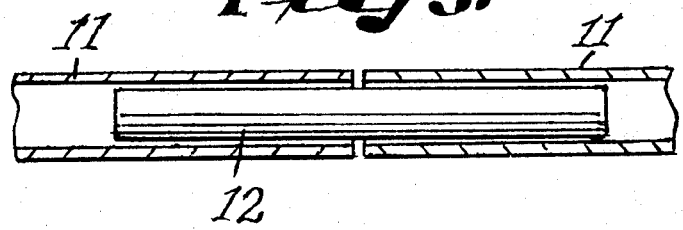
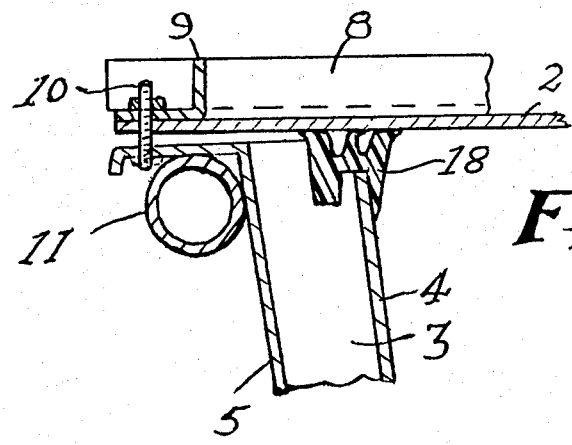
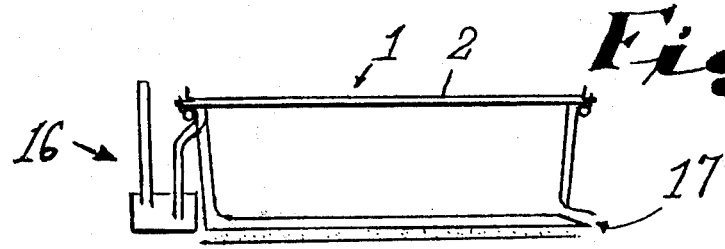

SILOS

FIELD OF THE INVENTION

This invention relates to silos.

BACKGROUND OF THE INVENTION

Silo-fodder or silage is generally produced by fermenting a suitable vegetable matter, such as husks or hay, in the presence of lactic acid in a silo. It is desireable that fermentation of the vegetable matter takes place in a substantially oxygen free atmosphere to prevent rotting.

Two types of silos are commonly employed in the production of silo-fodder. These may be termed as hopper-type silos and trench silos. The former is in the nature of a raised sheet metal structure adapted for top end loading and low level withdrawal. While such a silo may be made airtight to allow for oxygen-free fermentation, the cost of the silo is relatively high and special silo loading equipment is required.

The trench silo normally takes the form of an elongated trough of general U-shaped section. The trough may be located at ground level, or may be wholly or partially sunken into the ground. During the production of silo-fodder, the trough is covered by one or more plastic sheets. This arrangement offers the advantages of relatively low construction costs, and easy loading and compacting by means of common farm implements such as tractors. However, no effective protection is given against free oxygen, resulting in considerable losses due to rotting.

SUMMARY AND OBJECTS OF THE INVENTION

An object of the present invention is the provision of a novel silo which the applicant believes will have advantages over known silos.

According to the invention, a silo, suitable for producing silo-fodder, comprises a trough structure of generally U-shaped cross-section, a removable closure for the trough opening, and sealing means for providing a substantially gas tight seal between the closure and side walls of the trough.

Preferably the closure is a flexible sheet of suitable synthetic resinous material such as polyester.

In a further embodiment of the invention, the closure is a flexible sheet of suitable metal such as anodized aluminium.

Also according to the invention, the closure may be rolled back into a roll to at least partially open the trough structure.

Further according to the invention, the sealing means is in the nature of a tongue element adapted to associate with an abutment surface in substantially gas-tight fashion; preferably, the tongue is of resiliently flexible material; also, preferably the surface is of resiliently flexible material; and still further, according to the invention clamping, means is provided for urging the tongue and surface into sealing engagement with one another.

Thus, in one arrangement, according to the invention, a peripheral U-shaped channel concavity disposed upwards is provided on the trough walls in the region of the trough mouth and a complementary tongue element on the closure. With this arrangment the channel may be filled with a liquid, preferably water, to ensure that the seal between the tongue and channel is gas tight. A further refinement of this arrangement provides for a face of the tongue element, which engages the channel to be shaped to a concave profile to trap liquid in its concavity and thus prevent or retard evaporation of the liquid.

An alternative arrangement of the sealing means includes a tongue mounted peripherally on the trough wall to associate sealingly with the lower surface of the closure, the tongue having a substantially upwards disposed W-shaped channel concavity whereof the inner projection is of greater resilience than and extends slightly beyond the outer projection which provide a supporting surface for the closure.

Also according to the invention one or more transverse brace members are provided for the cover to prevent the latter from sagging unduly when in position. In a preferred arrangement a plurality of spaced substantially rigid cross braces are provided, the braces being adapted to bridge the trough opening. Where the cover is to be capable of being rolled up to open the silo, the braces are disposed either co-axially with the solo or at right angles to its axis.

Yet further according to the invention at least the inner surfaces of the silo are of, or lined with, a suitable synthetic resinous material, such as polyester. In one arrangement the trough walls may comprise a layer of rigid synthetic resinous foam sandwiched between an outer sheet of synthetic resinous material or metal, and an inner sheet of synthetic resinous material. With this arrangement the trough may be made up of a plurality of wall sections which are coupled together, with a sealing element being provided at the joints.

Alternatively the trough may be a concrete structure or the like, lined with synthetic resinous material.

Also included within the scope of this invention is a structural element suitable for use in the formation of a trough structure disclosed hereinbefore, the element comprising a layer of rigid synthetic resinous foam, sandwiched between an outer sheet of substantially rigid material, and an inner sheet of synthetic resinous material. The outer sheet is preferably of steel or synthetic resinous material. Preferably also the structural element is of substantially U-shaped cross-section so that a plurality of such elements may be located in contiguous relationship to form an elongated trough.

Further included within the scope of the invention is a closure suitable for use with the trough structure disclosed hereinbefore, the closure comprising a sheet of flexible synthetic resinous material provided with a peripheral tongue formation thereon. Preferably the tongue formation is of resiliently flexible material.

It is further intended to include within the scope of the invention a kit prefabricated structural parts suitable for the formation of a silo as hereinbefore disclosed, comprising a plurality of structural elements for forming the trough as hereinbefore disclosed and the closure as hereinbefore disclosed.

In order more clearly to illustrate the invention an example is described hereunder with reference to the accompanying drawings wherein:

BRIEF DESCRIPTION OF THE DRAWING

FIG. 2 is a side elevation of the silo in FIG. 1;

FIG. 3 is an enlarged fragmentary view on line II—II in FIG. 2;

FIG. 4 is a partial view on line III—III in FIG. 2;

FIG. 5 is an enlarged sectional view of a pipe joint employed in the silo in FIG. 1;

FIG. 6 is an enlarged sectional view of a pipe joint illustrating 6 an alternative sealing arrangement;

FIG. 7 is a schematic cross-sectional view of the silo in FIG. 1.

DESCRIPTION OF PREFERRED EMBODIMENTS

Figure 1:
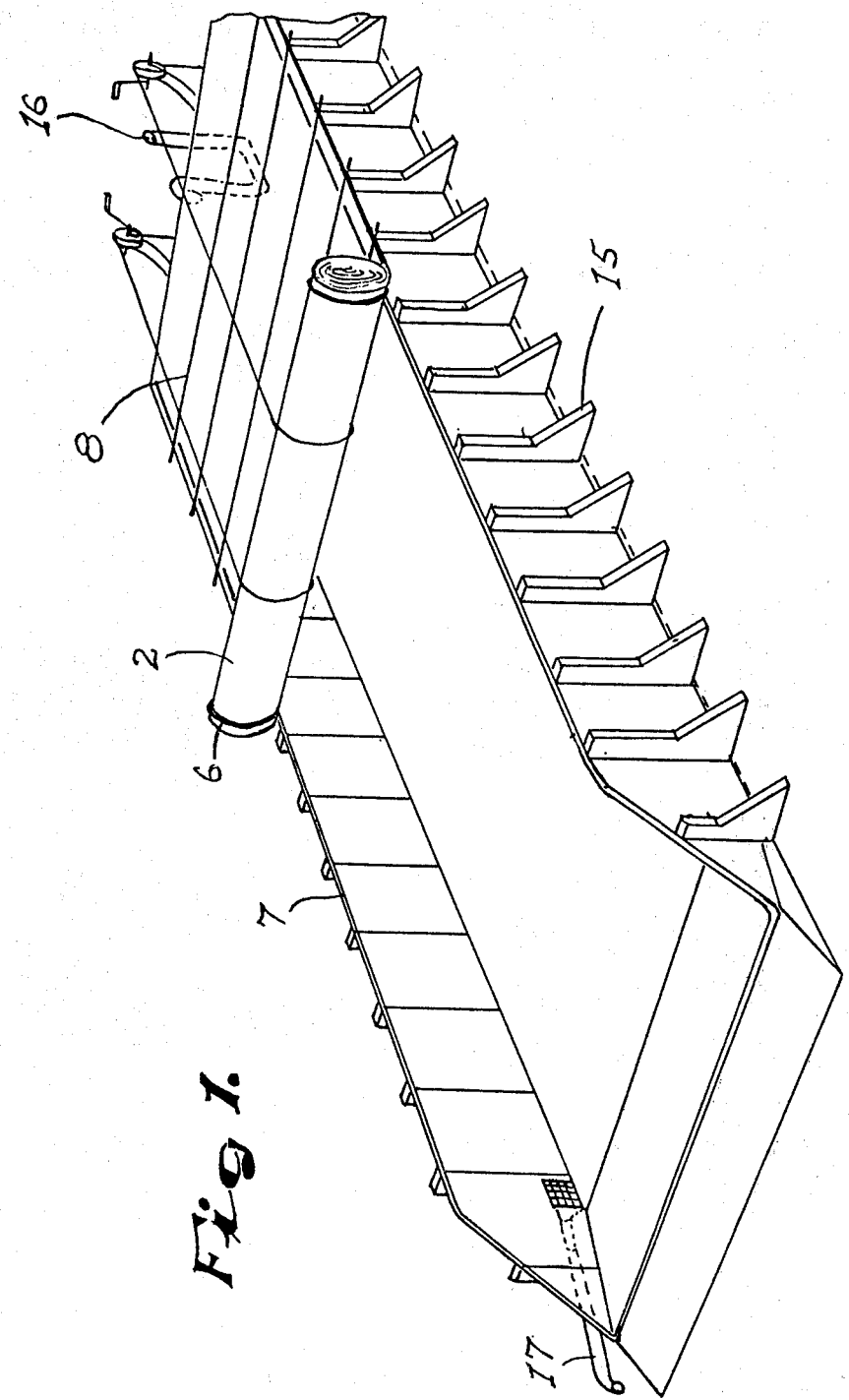
FIG. 1 is a perspective view of a silo.

Referring to the drawings a silo suitable for use in the production of silo fodder comprises an elongated trough 1 of generally U-shaped section, and a closure 2, the closure being in the form of a sheet of flexible synthetic resinous material such as polyester or of flexible metal such as anodized aluminium.

The closure may preferably be rolled back to open the trough and means may be provided for rolling back and closing the closure.

The trough may be constructed in a number of ways, but preferably it is made up of a number of prefabricated sections which are placed in contiguous relationship to form the elongated shape illustrated while the floor is of poured concrete.

The trough may also be constructed of structural elements shaped to constitute two planes of the trough structure or of structural elements of substantially U-shaped cross-section.

The inner face of the trough walls is lined with or formed of a suitable chemically inert material such as polyester.

In one arrangement, FIG. 3, the trough walls may comprise an outer sheet of steel, or polyester, and an inner sheet of polyester, with a layer of rigid foam such as polyurethane foam sandwiched between the sheet.

In another arrangement, not shown, the walls may be of a suitably reinforced concrete, with the inner surfaces faced with polyester sheets.

In yet a further arrangement the trough walls may be of glass fibre reinforced concrete.

It will be appreciated that the invention is not restricted to these embodiments, several alternatives being equally suitable.

Nor is any restriction placed on the location of the trough, which may be located at ground level, or wholly or partially sunken into the ground.

Where the trough walls are in the form of a foam sandwich, FIG. 4, the wall sections are coupled together by means of split clamp rings 13 which engage over inwardly directed lugs 5a. A sealing member 14 is provided at the joints as illustrated to give an air-tight seal.

Rigidity is given to the trough by providing a rigid pipe member 11, FIG. 3, along the periphery of each trough section towards the mouth region thereof. In FIG. 3, the pipe 11 is secured to the outer sheet of the trough wall. The pipe 11 may also conveniently be imbedded in the trough wall. When the trough is erected, contiguous pipes are coupled together in spigot and socket fashion by means of a rod member 12 as illustrated in FIG. 5.

A feature of the invention is that the closure 2, when in position, seals the trough in substantially gas-tight fashion. This is accomplished by providing a resiliently flexible peripheral tongue element 6 on the closure 2, and a corresponding abutment surface 7 on the trough wall. Preferably the abutment surface is a peripheral U-shaped channel into which the tongue 6 fits, FIG. 3. In FIG. 3, the channel 7 is located in the rim of the trough wall, but it may be mounted on the inner or outer face of the wall if this is desirable for any reason.

For sealing purposes, the channel 7, FIG. 3, may be filled with water or other suitable liquid. If necessary the lower face 6a of the tongue 6 may be formed to concave shape for the purpose of trapping the water in its concavity to prevent evaporation.

An alternative arrangement of the sealing means is illustrated in FIG. 6. A resiliently flexible peripheral tongue 18, having a substantially W-shaped profile is provided on the trough wall. The outer projections of the tongue serve to support the closure 2, while the inner projection, which is longer, thinner and more resilient than the outer projections is depressed into sealing engagement with the lower surface of the closure 2. The channels of the tongue 18 may also be filled with a suitable liquid such as water, to improve the seal.

Nut and bolt means 10 may conviently be employed to clamp the closure 2 in position over the trough. In one embodiment the bolt may pass through an outwardly turned flange on the wall sheet 5 or alternatively it may pass through the pipe member 11.

Other structural feature of the silo include outwardly angled braces 15 for the trough walls; cross braces or battens 8 for the closure 2 to prevent undue sagging thereof, the battens being preferably removably fixed to the closure e.g. by sliding the braces through sleeves or brackets provided on the upper surface on the closure 2; and peripheral clamping braces 9, FIG. 3, through which the bolts 10 pass.

The closure should be given a convex aspect to facilitate runoff of moisture or rain by either suspending the central area thereof from an overhead structure or alternatively by using convex braces or flexible braces which are buckled by bending the ends down and fixing them into position.

During the production of silo fodder excess liquid may be drained from the silo by way of a low level discharge 17, FIG. 6, while gaseous products of fermentation may escape through a high level, syphon-type outlet 16. Further, the bottom may be constructed on an angle as seen in FIG. 2.

The silo of the invention provides a substantially oxygen free atmosphere for fodder production thus overcoming the problem of rotting, and it is further anticipated that it will be relatively inexpensive and durable.

Clearly many variations of the invention exist each differing in matters of detail only, but in no way departing from the principles as set out in the consistory clauses.

Having now particularly described and ascertained our said invention and in which manner the same is to be performed, we declare that what we claim is:

1. A silo suitable for producing silo fodder, comprising:

an open-topped trough structure of generally U-shaped cross-section and having an inclined bottom surface;

a low level discharge means leading from the bottom of the trough structure for draining excess liquid;

a high level siphon outlet leading from the top of the trough structure for the discharge of gases;

a trough closure of semi-rigid flexible material, which is progressively removable and adapted to be removed to at least partially open the trough structure;

a tongue element of resiliently flexible material associated between the closure and trough; and an abutment surface between the closure and trough, the tongue element being adapted to engage with the abutment surface in substantially gas-tight fashion for providing a substantially gas-tight seal between the closure and the side walls of the trough.

2. A silo as claimed in claim 1 wherein the closure is a flexible sheet of suitable synthetic resinous material such as polyester.

3. A silo as claimed in claim 1 wherein the closure is a flexible sheet of suitable metal such as anodized aluminium.

4. A silo as claimed in claim 1 wherein the closure may be rolled back to at least partially open the trough structure.

5. A silo as claimed in claim 1 wherein clamping means is provided for urging the tongue and surface into sealing engagement with one another.

6. A silo as claimed in claim 1 wherein a peripheral U-shaped upwards disposed channel concavity is provided on the trough walls in the region of the trough mouth and a complementary tongue element is provided on the closure.

7. A silo as claimed in claim 6 wherein the channel is adapted to be filled with a liquid, preferably water, to ensure that the seal between the tongue and channel is gas-tight.

8. A silo as claimed in claim 7 wherein the face of the tongue element which engages the channel is shaped to a concave profile adapted to trap liquid in its concavity to prevent or retard evaporation of the liquid.

9. A silo as claimed in claim 1 wherein the tongue element is mounted peripherally on the trough wall to associate sealingly with the lower surface of the closure, the tongue element having a substantially upwards disposed W-shaped channel concavity whereof the inner projection is of greater resilience than and extends slightly beyond the outer projections which provide a supporting surface for the closure.

10. A silo as claimed in claim 1 having at least one transverse brace members adapted to support the closure when in position.

* * * * *